(12) United States Patent
Betts

(10) Patent No.: US 10,347,016 B2
(45) Date of Patent: Jul. 9, 2019

(54) CONVERTING FONT CONTOUR CURVES

(71) Applicant: Monotype Imaging Inc., Woburn, MA (US)

(72) Inventor: William Elliott Betts, Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 14/993,424

(22) Filed: Jan. 12, 2016

(65) Prior Publication Data
US 2017/0200292 A1    Jul. 13, 2017

(51) Int. Cl.
*G06T 11/20*    (2006.01)
(52) U.S. Cl.
CPC .................. *G06T 11/203* (2013.01)
(58) Field of Classification Search
CPC .................. G06T 11/203; G06T 11/20
See application file for complete search history.

(56) References Cited

U.S. PATENT DOCUMENTS

| | | | | |
|---|---|---|---|---|
| 4,620,287 A * | 10/1986 | Yam | ...................... | G06T 11/203 345/442 |
| 4,675,830 A * | 6/1987 | Hawkins | .................. | G06T 9/20 345/469 |
| 4,933,866 A * | 6/1990 | Markoff | ................. | G06K 15/02 345/471 |
| 5,189,730 A * | 2/1993 | Kajimoto | .............. | G06T 11/203 345/442 |
| 5,214,754 A * | 5/1993 | Okamoto | .............. | G06T 11/203 345/442 |
| 5,253,336 A * | 10/1993 | Yamada | ................ | G06T 11/203 345/441 |
| 5,269,000 A * | 12/1993 | Ohuchi | .................... | G09G 5/20 345/442 |
| 5,309,521 A * | 5/1994 | Matsukawa | ........... | G06T 11/203 345/442 |

(Continued)

OTHER PUBLICATIONS

Joy, A Divide and Conquer Method for Curve Drawing, 2012, http://graphics.cs.ucdavis.edu/~joy/ecs178/Unit-2-Notes/Divide-and-Conquer-Bezier-Curve.pdf (Year: 2012).*

(Continued)

*Primary Examiner* — Devona E Faulk
*Assistant Examiner* — Charles L Beard
(74) *Attorney, Agent, or Firm* — Fish & Richardson P.C.

(57) ABSTRACT

A system includes a computing device that includes a memory configured to store instructions. The system also includes a processor to execute the instructions to perform operations that include receiving data representative of a portion of a font character. The portion of the font character being represented as one or more cubic curves. Operations also include determining one or more quadratic curves that approximately track the shape of the one or more cubic curves. In a geometric and recursive manner, determining the one or more quadratic curves includes using a predefined tolerance to compare the one or more quadratic curves to the one or more cubic curves. Operations also include preparing data to represent the one or more quadratic curves to represent the portion of the font character.

30 Claims, 14 Drawing Sheets

(56) References Cited

U.S. PATENT DOCUMENTS

| | | | | |
|---|---|---|---|---|
| 5,367,617 A * | 11/1994 | Goossen | ................ | G06F 17/17 345/442 |
| 5,408,598 A * | 4/1995 | Pryor, Jr. | ................ | G06F 17/17 345/442 |
| 5,428,728 A * | 6/1995 | Lung | ................ | G06K 15/02 345/469 |
| 5,471,573 A * | 11/1995 | Kaasila | ................ | G06T 11/203 345/441 |
| 5,539,868 A * | 7/1996 | Hosoya | ................ | G06T 11/203 345/441 |
| 5,572,605 A * | 11/1996 | Toraichi | ................ | G06T 9/20 358/1.9 |
| 5,638,503 A * | 6/1997 | Hoel | ................ | G06F 5/10 345/442 |
| 5,673,371 A * | 9/1997 | Koopman | ................ | G06K 15/02 345/467 |
| 5,687,254 A * | 11/1997 | Poon | ................ | G06K 9/00335 382/187 |
| 5,694,535 A * | 12/1997 | Broekhuijsen | ................ | G06T 11/203 345/442 |
| 5,726,896 A * | 3/1998 | Jia | ................ | G06T 11/203 318/568.13 |
| 5,734,388 A * | 3/1998 | Ristow | ................ | G06K 15/02 345/469 |
| 5,734,756 A * | 3/1998 | Sherman | ................ | G06T 11/203 382/259 |
| 5,754,187 A * | 5/1998 | Ristow | ................ | G06K 15/02 345/469 |
| 5,781,714 A * | 7/1998 | Collins | ................ | G06F 17/214 345/471 |
| 5,818,459 A * | 10/1998 | Kurumida | ................ | G06T 11/203 345/442 |
| 5,859,647 A * | 1/1999 | Kurumida | ................ | G06T 9/001 345/442 |
| 5,870,084 A * | 2/1999 | Kanungo | ................ | H04N 21/40 345/551 |
| 5,900,884 A * | 5/1999 | Minami | ................ | G06F 17/17 345/442 |
| 6,295,072 B1 * | 9/2001 | Pon | ................ | G06T 11/203 345/442 |
| 6,459,439 B1 * | 10/2002 | Ahlquist, Jr. | ................ | G06T 11/203 345/619 |
| 6,512,847 B1 * | 1/2003 | Gnutzmann | ................ | G06T 11/203 382/173 |
| 6,542,157 B1 * | 4/2003 | Browne | ................ | G06T 11/203 345/441 |
| 6,760,028 B1 * | 7/2004 | Salesin | ................ | G06T 11/203 345/467 |
| 6,922,606 B1 * | 7/2005 | Yutkowitz | ................ | G05B 19/00 318/560 |
| 6,992,671 B1 * | 1/2006 | Corona | ................ | G06T 9/20 345/467 |
| 7,239,319 B2 * | 7/2007 | Loop | ................ | G06T 11/203 345/467 |
| 7,263,538 B2 * | 8/2007 | Hong | ................ | G06T 11/203 382/316 |
| 7,339,588 B2 * | 3/2008 | Iwata | ................ | G06T 11/203 345/442 |
| 7,639,258 B1 * | 12/2009 | Dowling | ................ | G06T 11/203 345/441 |
| 7,646,387 B2 * | 1/2010 | Dowling | ................ | G06K 15/02 345/469 |
| 7,719,536 B2 * | 5/2010 | Dowling | ................ | G06T 11/203 345/467 |
| 7,868,887 B1 * | 1/2011 | Yhann | ................ | G06T 11/203 345/442 |
| 7,928,984 B1 * | 4/2011 | Yhann | ................ | G06T 15/005 345/442 |
| 8,068,106 B1 * | 11/2011 | Yhann | ................ | G06T 11/203 345/442 |
| 8,102,397 B2 * | 1/2012 | Perry | ................ | G06T 11/203 345/467 |
| 8,274,514 B1 * | 9/2012 | Martino | ................ | G06T 3/00 345/441 |
| 8,521,797 B2 * | 8/2013 | Hayes | ................ | G06F 17/17 708/200 |
| 8,643,650 B1 * | 2/2014 | Vinchon | ................ | G06T 11/203 345/423 |
| 8,787,677 B2 * | 7/2014 | Oto | ................ | G06K 9/481 382/197 |
| 9,025,909 B2 * | 5/2015 | Refstrup | ................ | G06F 17/211 382/298 |
| 9,317,777 B2 * | 4/2016 | Kaasila | ................ | G06F 17/214 |
| 9,418,454 B1 * | 8/2016 | Smith | ................ | G06T 11/203 |
| 9,529,778 B2 * | 12/2016 | Hayes | ................ | G06F 17/17 |
| 10,146,994 B2 * | 12/2018 | Jin | ................ | G06K 9/00456 |
| 2002/0036639 A1 * | 3/2002 | Bourges-Sevenier | ................ | G06T 11/203 345/474 |
| 2002/0105515 A1 * | 8/2002 | Mochizuki | ................ | G06T 11/203 345/419 |
| 2003/0187613 A1 * | 10/2003 | Cheng | ................ | G06F 17/17 702/179 |
| 2004/0006749 A1 * | 1/2004 | Fux | ................ | G06F 17/214 715/263 |
| 2004/0041811 A1 * | 3/2004 | Lin | ................ | G06T 11/203 345/467 |
| 2004/0090437 A1 * | 5/2004 | Uesaki | ................ | G06T 17/30 345/420 |
| 2004/0189643 A1 * | 9/2004 | Frisken | ................ | G06T 11/203 345/467 |
| 2005/0007365 A1 * | 1/2005 | Cao | ................ | G06T 11/203 345/441 |
| 2005/0007369 A1 * | 1/2005 | Cao | ................ | G06T 11/20 345/442 |
| 2005/0007381 A1 * | 1/2005 | Chen | ................ | G06T 11/203 345/442 |
| 2005/0012750 A1 * | 1/2005 | Uesaki | ................ | G06T 17/20 345/531 |
| 2005/0052470 A1 * | 3/2005 | Hemmings | ................ | G06T 11/203 345/649 |
| 2005/0073520 A1 * | 4/2005 | Papakipos | ................ | G06T 17/30 345/420 |
| 2005/0238244 A1 * | 10/2005 | Uzawa | ................ | G06T 9/20 382/242 |
| 2006/0017731 A1 * | 1/2006 | Matskewich | ................ | G09G 5/246 345/467 |
| 2006/0044312 A1 * | 3/2006 | Loop | ................ | G06T 11/203 345/443 |
| 2006/0192781 A1 * | 8/2006 | Iwata | ................ | G09G 5/246 345/467 |
| 2006/0197760 A1 * | 9/2006 | Yamada | ................ | G06T 17/20 345/423 |
| 2006/0256115 A1 * | 11/2006 | Cao | ................ | G06T 11/20 345/442 |
| 2007/0110289 A1 * | 5/2007 | Fu | ................ | G06K 9/32 382/128 |
| 2008/0079728 A1 * | 4/2008 | Sugita | ................ | G06T 11/203 345/441 |
| 2008/0256155 A1 * | 10/2008 | Hayes | ................ | G06T 17/30 708/290 |
| 2009/0027396 A1 * | 1/2009 | Frisken | ................ | G06K 9/6207 345/442 |
| 2009/0027397 A1 * | 1/2009 | Frisken | ................ | G06K 9/00416 345/442 |
| 2009/0027398 A1 * | 1/2009 | Frisken | ................ | G06K 9/00409 345/442 |
| 2009/0141038 A1 * | 6/2009 | Newaskar | ................ | G06T 11/203 345/589 |
| 2009/0225078 A1 * | 9/2009 | Rossignac | ................ | G06T 11/203 345/423 |
| 2010/0060642 A1 * | 3/2010 | Chhaparwal | ................ | G06T 11/206 345/440 |
| 2010/0141659 A1 * | 6/2010 | Bourd | ................ | G06T 11/203 345/442 |
| 2010/0177118 A1 * | 7/2010 | Sytnikov | ................ | G06T 11/60 345/619 |

(56) References Cited

U.S. PATENT DOCUMENTS

| | | | | |
|---|---|---|---|---|
| 2010/0182328 A1* | 7/2010 | Pirchio | G06T 11/203 | 345/474 |
| 2010/0289802 A1* | 11/2010 | Falchetto | G06T 11/203 | 345/442 |
| 2010/0322527 A1* | 12/2010 | Fablet | G06F 17/2252 | 382/232 |
| 2011/0025693 A1* | 2/2011 | Merry | G06T 11/203 | 345/442 |
| 2011/0053532 A1* | 3/2011 | Fudaba | H03F 1/0222 | 455/127.1 |
| 2011/0115797 A1* | 5/2011 | Kaplan | G06T 11/203 | 345/467 |
| 2011/0122139 A1* | 5/2011 | Lee | G06T 11/203 | 345/441 |
| 2011/0148942 A1* | 6/2011 | Furihata | G09G 5/003 | 345/690 |
| 2011/0164041 A1* | 7/2011 | Miura | G06T 11/203 | 345/442 |
| 2011/0285721 A1* | 11/2011 | Kilgard | G06T 11/203 | 345/442 |
| 2011/0285736 A1* | 11/2011 | Kilgard | G06T 11/203 | 345/584 |
| 2012/0051655 A1* | 3/2012 | Oto | G06T 9/001 | 382/199 |
| 2012/0154406 A1* | 6/2012 | Yuda | G06T 11/203 | 345/442 |
| 2012/0268794 A1* | 10/2012 | Soulard | G06T 11/203 | 358/1.18 |
| 2012/0287135 A1* | 11/2012 | Pfeifle | G06T 11/203 | 345/442 |
| 2013/0018636 A1* | 1/2013 | Ruf | G06F 17/17 | 703/2 |
| 2013/0100138 A1* | 4/2013 | Moriyama | G06T 11/203 | 345/442 |
| 2013/0120396 A1* | 5/2013 | Kaplan | G06T 11/203 | 345/471 |
| 2013/0127836 A1* | 5/2013 | Joshi | G06T 11/203 | 345/419 |
| 2013/0132051 A1* | 5/2013 | Hadap | G06T 11/203 | 703/6 |
| 2013/0147800 A1* | 6/2013 | Ogata | G06T 17/00 | 345/420 |
| 2013/0293554 A1* | 11/2013 | Vostrikov | G06T 11/203 | 345/442 |
| 2014/0015838 A1* | 1/2014 | Yoo | G06T 11/203 | 345/442 |
| 2014/0025194 A1* | 1/2014 | Koide | G05B 19/182 | 700/187 |
| 2014/0043330 A1* | 2/2014 | Ceylan | G06T 17/20 | 345/423 |
| 2014/0160125 A1* | 6/2014 | Yoo | G06T 11/203 | 345/423 |
| 2014/0176560 A1* | 6/2014 | Mayot | G06T 11/203 | 345/442 |
| 2014/0247276 A1* | 9/2014 | Pedreira | G06F 3/048 | 345/610 |
| 2014/0320540 A1* | 10/2014 | Deach | G06T 3/40 | 345/666 |
| 2014/0354652 A1* | 12/2014 | Negishi | G09G 5/24 | 345/471 |
| 2015/0062129 A1* | 3/2015 | Wilensky | G06T 11/203 | 345/442 |
| 2015/0063706 A1* | 3/2015 | Lampinen | G06T 11/203 | 382/197 |
| 2015/0077420 A1* | 3/2015 | Bolz | G06T 11/203 | 345/442 |
| 2015/0142808 A1* | 5/2015 | Ren | G06K 9/6223 | 707/737 |
| 2015/0178961 A1* | 6/2015 | Karras | G06T 11/203 | 345/442 |
| 2015/0178974 A1* | 6/2015 | Goel | G06T 1/20 | 345/420 |
| 2015/0228094 A1* | 8/2015 | Yoo | G06T 11/203 | 345/442 |
| 2015/0339849 A1* | 11/2015 | Iwamoto | G06T 17/10 | 345/420 |
| 2015/0348297 A1* | 12/2015 | Kaasila | G06T 1/20 | 345/467 |
| 2015/0371417 A1* | 12/2015 | Angelov | G06Q 10/101 | 345/442 |
| 2016/0163068 A1* | 6/2016 | Uemura | G06T 17/30 | 382/286 |
| 2016/0180819 A1* | 6/2016 | Chang | G06F 17/214 | 345/469 |
| 2016/0247029 A1* | 8/2016 | Dorum | G06K 9/00791 | |
| 2017/0008148 A1* | 1/2017 | Wuerfel | B24B 53/083 | |
| 2017/0039739 A1* | 2/2017 | Doran | G06T 11/203 | |
| 2017/0076470 A1* | 3/2017 | Yoo | G06T 11/203 | |
| 2017/0236021 A1* | 8/2017 | Petkov | G06F 3/03545 | 345/179 |

OTHER PUBLICATIONS

Joy, Quadratic Bezier Curves, 2012, http://graphics.cs.ucdavis.edu/~joy/ecs178/Unit-2-Notes/Quadratic-Bezier-Curves.pdf (Year: 2012).*

* cited by examiner

700

*Curve Conversion code:*

```
bool function CheckRight(StartTangent, StartTarget, startSegmentIndex)
    currentIndex = longest tangent that intersects StartTarget.
    intersectsStartTarget = true;
    foundSolution = false;
    while (intersectsStartTarget && (false == foundSolution))
        intersectsStartTarget = currentTangent.SegsIntersect(startTarget);
        Create the target segment of the current tangent.
        Push current tangent onto evaluation stack.
        if (target Intersects cubic end tangent) then
            foundSolution = Evaluate tangents on evaluation stack;
        else
            foundSolution = call CheckRight(Tangent, Target, currentIndex+1);
        endif
        Pop evaluation stack.
        currentIndex--;
    endwhile
```

FIG. 7

CONVERTING FONT CONTOUR CURVES

BACKGROUND

This description relates to converting representations of the shape of font character outlines from one form that is into another, e.g., from cubic Bezier curves to quadratic Bezier curves.

The astronomical growth of available textual content on the Internet has lead users to demand more variety in expressing this content. Similar to the variety of products provided by physical and online stores; content authors, publishers and viewers have grown to expect a wide assortment of content viewing formats, such as different fonts to view text-based assets. Software-based font editors allow original fonts to be created along with providing the functionality to modify existing fonts to create further new fonts. Based upon their design, such new fonts can assist with conveying information along with the textual content being displayed.

SUMMARY

The systems and techniques described allow for efficient conversion of shapes used to define the contours of font characters, glyphs, etc. After easily-adjustable cubic Bezier curves are used by an editor to define, modify, etc. the shape of a contour, the curves can be converted into another form such as quadratic Bezier curves. Compared to other algorithms less data points may be needed to define the font character shapes and the overall amount of data needed to represent the quadratic Bezier curves can be reduced, e.g., for efficient storage, transmission (e.g., over the Internet), use in other applications, etc. Such conversion is important in order to achieve visual compatibility between OpenType fonts in the Compact Font Format (CFF) that are used primarily in print applications and describe glyph outlines in terms of cubic Bezier curves and OpenType fonts in TrueType format which are used primarily in internet applications and describe glyph outlines in terms of quadratic Bezier curves. When converting font outlines described by cubic Bezier curves to outlines described by quadratic Bezier curves some form of approximation is required since cubic curves are of a higher polynomial order than quadratic curves. Finding efficient approximation techniques that accurately fit the curves that represent glyph shapes is described.

In one aspect, a computing device implemented method includes receiving data representative of a portion of a font character. The portion of the font character being represented as one or more cubic curves. The method also includes, in a geometric and recursive manner, determining one or more quadratic curves that approximately track the shape of the one or more cubic curves. Determining the one or more quadratic curves includes using a predefined tolerance to compare the one or more quadratic curves to the one or more cubic curves. The method also includes preparing data to represent the one or more quadratic curves to represent the portion of the font character.

Implementations may include one or more of the following features. The one or more cubic curves may be cubic Bezier curves. The one or more quadratic curves may be quadratic Bezier curves. At least one point defining one of the quadratic curves may be located at a midpoint between two other points. At least one point may be located on a tangent to the one of the quadratic curves. The data prepared to represent the one or more quadratic curves may be absent data representing the at least one point located at the midpoint between the two other points. In a geometric and recursive manner, determining one or more quadratic curves that approximately track the shape of the one or more cubic curves may be executed in a recursive manner. The predefined tolerance may be user specified. The predefined tolerance may represent the maximal orthogonal distance between at least one of the one or more cubic curves and at least one of the one or more quadratic curves. Each of the one or more cubic curves may be defined by at least four points. Each of the one or more quadratic curves may be defined by at least three points.

In another aspect, a system includes a computing device that includes a memory configured to store instructions. The system also includes a processor to execute the instructions to perform operations that include receiving data representative of a portion of a font character. The portion of the font character being represented as one or more cubic curves. Operations also include, in a geometric and recursive manner, determining one or more quadratic curves that approximately track the shape of the one or more cubic curves. Determining the one or more quadratic curves includes using a predefined tolerance to compare the one or more quadratic curves to the one or more cubic curves. Operations also include preparing data to represent the one or more quadratic curves to represent the portion of the font character.

Implementations may include one or more of the following features. The one or more cubic curves may be cubic Bezier curves. The one or more quadratic curves may be quadratic Bezier curves. At least one point defining one of the quadratic curves may be located at a midpoint between two other points. At least one point may be located on a tangent to the one of the quadratic curves. The data prepared to represent the one or more quadratic curves may be absent data representing the at least one point located at the midpoint between the two other points. In a geometric and recursive manner, determining one or more quadratic curves that approximately track the shape of the one or more cubic curves may be executed in a recursive manner. The predefined tolerance may be user specified. The predefined tolerance may represent the maximal orthogonal distance between at least one of the one or more cubic curves and at least one of the one or more quadratic curves. Each of the one or more cubic curves may be defined by at least four points. Each of the one or more quadratic curves may be defined by at least three points.

In another aspect, one or more computer readable media storing instructions that are executable by a processing device, and upon such execution cause the processing device to perform operations that include receiving data representative of a portion of a font character. The portion of the font character being represented as one or more cubic curves. Operations also include, in a geometric and recursive manner, determining one or more quadratic curves that approximately track the shape of the one or more cubic curves. Determining the one or more quadratic curves includes using a predefined tolerance to compare the one or more quadratic curves to the one or more cubic curves. Operations also include preparing data to represent the one or more quadratic curves to represent the portion of the font character.

Implementations may include one or more of the following features. The one or more cubic curves may be cubic Bezier curves. The one or more quadratic curves may be quadratic Bezier curves. At least one point defining one of the quadratic curves may be located at a midpoint between two other points. At least one point may be located on a tangent to the one of the quadratic curves. The data prepared to represent the one or more quadratic curves may be absent data representing the at least one point located at the midpoint between the two other points. In a geometric and recursive manner, determining one or more quadratic curves that approximately track the shape of the one or more cubic curves may be executed in a recursive manner. The predefined tolerance may be user specified. The predefined tolerance may represent the maximal orthogonal distance between at least one of the one or more cubic curves and at least one of the one or more quadratic curves. Each of the one or more cubic curves may be defined by at least four points. Each of the one or more quadratic curves may be defined by at least three points.

These and other aspects, features, and various combinations may be expressed as methods, apparatus, systems, means for performing functions, program products, etc.

Other features and advantages will be apparent from the description and the claims.

DESCRIPTION OF DRAWINGS

FIG. 7 is a listing of pseudo code instructions for converting Bezier curves.

DETAILED DESCRIPTION

Figure 1:
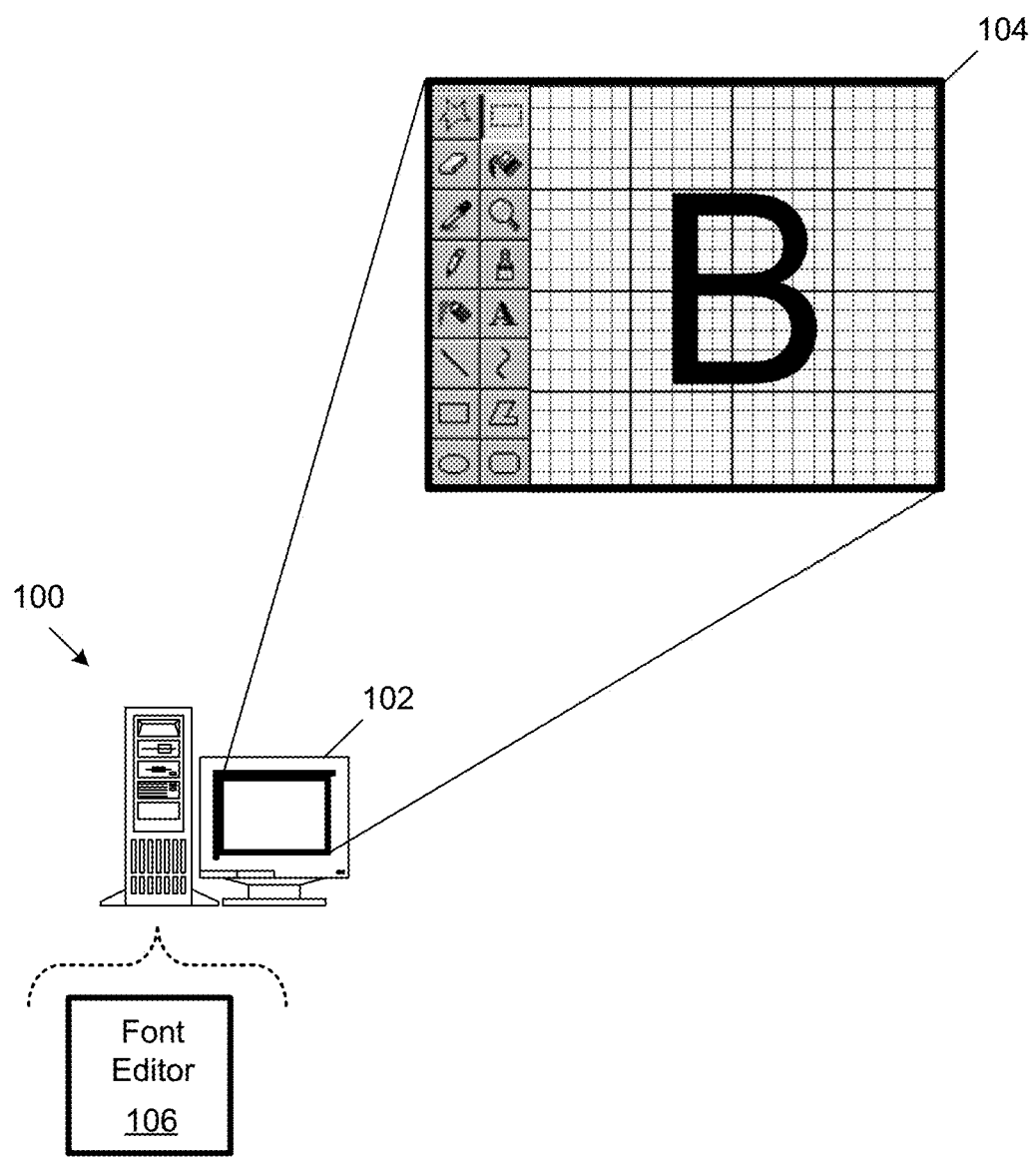
FIG. 1 illustrates a computer system presenting a font editor interface.

Referring to FIG. 1, a computing device (e.g., computer system 100) includes a display 102 that presents a graphical user interface (GUI) 104 of a font editor 106 that is being executed by the computing device. Along with allowing a user to develop new types of fonts, the font editor 106 may provide other types of functionality such as allowing previously developed fonts to be manipulated for producing one or more new fonts. By efficiently defining the developed fonts, the font editor 106 may conserve memory, improve data transmission (e.g., reduce transmission time), etc. One or more techniques may be implemented for such improvements; for example, curves used to define the shapes of the font character contours may be represented differently and in more efficient manners. The font editor 106 may represent fonts under development in one format; for example, a compact font format (CFF) such as OpenType fonts may be used to encode glyph outlines used to represent the font character shapes. Such a format employs cubic Bezier curves, and each cubic curve can be represented by four points in a plane. One point represents the starting point of the curve. A second point (e.g., first control point) defines the direction that the curve departs from the start point. A third point (e.g., a second control point) defines the direction that the curve approaches an end point of the curve (i.e., the end point is the fourth point of the curve). While the first and fourth points (i.e., start and end points) lie on the path of the curve, typically the curve does not pass through the second and third points (e.g., the control points). From a designer's point of view, such cubic Bezier curves can be considered easy to use and rather intuitive when creating and editing shapes. As such, font editors often employ such cubic curves to represent contour shapes.

Other formats use different encoding schemes for representing contour shapes; for example, widely used TrueType fonts employ quadratic Bezier curves to define the shapes of font characters. In general, a quadratic Bezier curve can be defined by three points (e.g., two points that lie on the curve and a third point—referred to as a control point that is located off the curve). In general, cubic Bezier curves can represent more complex curves than quadratic Bezier curves. As such more than one quadratic Bezier curve is often needed to accurately represent one cubic Bezier curve. However, converting cubic Bezier curves into quadratic Bezier curves is often needed to represent the font characters in forms such as TrueType fonts. Advantageously, relative to some algorithms, the amount of points needed to represent font character contours is reduced through the conversion, thereby reducing memory needs for various operations (e.g., data storage, data transmission, etc.).

Figure 2:
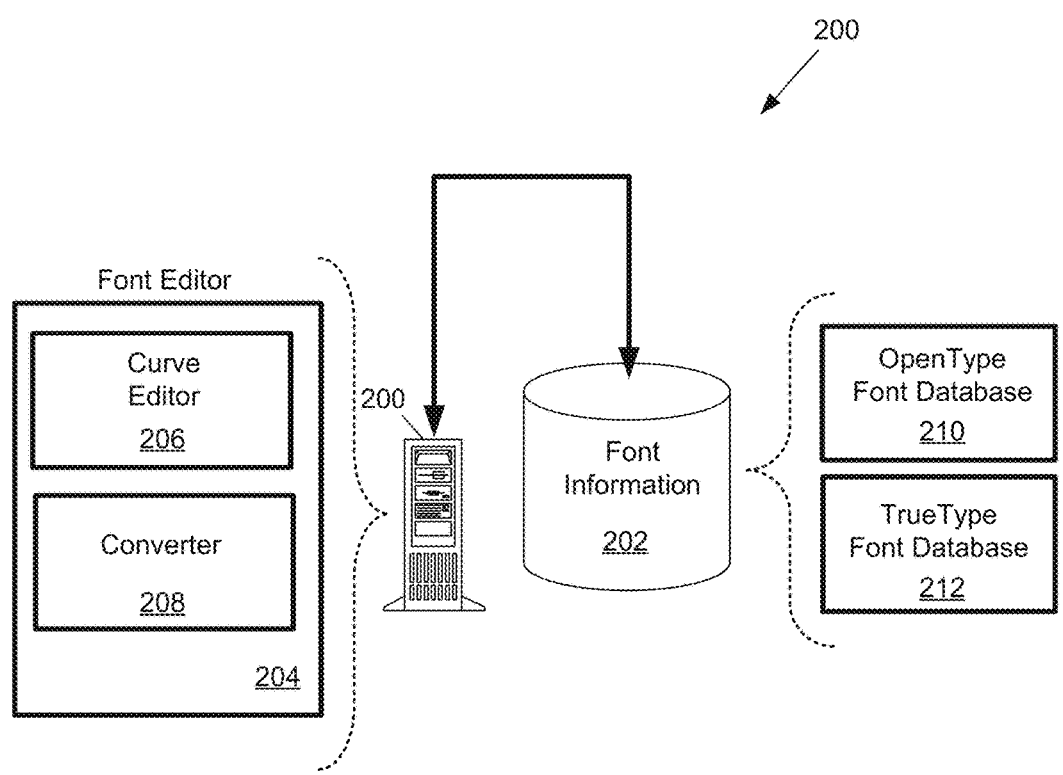
FIG. 2 is a block diagram of a portion of a font editor and a data storage archive.

Referring to FIG. 2, a computing device 200 (e.g., the processing portion of the computer system 100 of FIG. 1) is illustrated as being in communication with a storage device 202 (e.g., one or more hard drives). The computing device 202 is also represented as executing a font editor 204 (e.g., the fonts editor 106 of FIG. 1) that may be implemented in software, hardware, a combination of software and hardware, etc. In this arrangement, the font editor 204 is illustrated to include two modules, a curve editor 206 that can provide functionality such as communicating with a GUI to assist a designer in defining one or more curves (e.g., cubic Bezier curves) to represent shapes of font character contours. The font editor 204 also includes a converter 208 for converting the contour curves (e.g., cubic Bezier curves) used by the curve editor 206 into a different form (e.g., quadratic Bezier curves) for other operations (e.g., represent the contours in a TrueType font). In some arrangements, the functionality of the converter 208 may be implemented independent of the font editor 204. For example, the converter may be developed as a stand-alone application, software tool, etc. that operates in an independent manner. Other functionality can also be provided by the converter 208 or used in concert with the converter. For example, operations may be included to define font subsets (e.g., for instances when less that a complete set of font characters are needed, e.g., for transmission) that could then be converted. To assist with the operations of the font editor 204, the storage device 202 may store a variety of font information. For example, one database (e.g., OpenType font database 210) may store font character contours, etc. in a form that implements cubic Bezier curves (e.g., for presenting by the font editor to a designer). Another database (e.g., a TrueType font database 212) may be present in the storage device 202 for storing data that employs quadratic Bezier curves. Other types of computer architectures may employed; for example, distributed systems may be implemented in which one or more networks (e.g., the Internet) are used for exchanging information such as font characters, contours, etc.

One or more converting techniques may be employed by the converter 208; for example, geometric techniques that use properties, relationships, etc. of points, lines, angles, etc. may be used. Such techniques may employ heuristic methods for performing conversions; for example, attained information may be used to improve the tracking of the shape of a source Bezier curve by identified quadratic Bezier curves. Recursive techniques can be employed by such heuristic methods. In one arrangement, a geometric technique is used to find control points for a series of quadratic Bezier curves that together approximate a source cubic Bezier curve. Intersections between tangents of the source cubic can be heuristically selected such that a reasonable quadratic solution is attained that satisfies a predefined separation tolerance between the curves (e.g., a maximum orthogonal distance). The tangent intersections can be recursively manipulated, and when the source cubic curve is covered by the intersections the potential quadratic solution can be evaluated to determine if appropriate. In some arrangements, the technique used to identify the quadratic curves can be biased to identify solutions with the least number of control points. The number of control points can be increased by the converter 208 until a solution is identified that satisfies the predefined separation tolerance.

Figure 3:
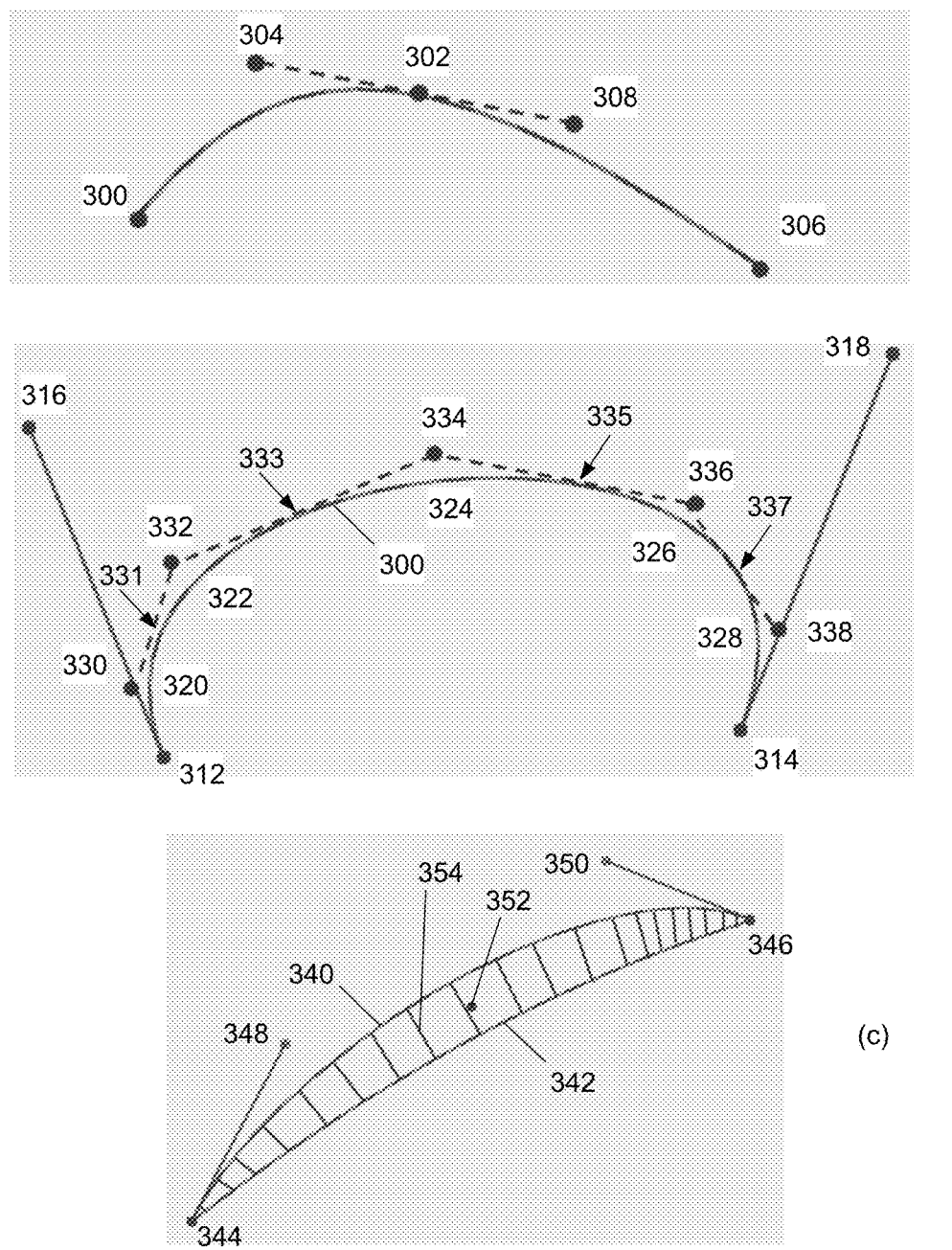
FIGS. 3-6 illustrates converting cubic Bezier curves that represent a font character contour into quadratic Bezier curves.

Referring to FIG. 3, graphical representations illustrate the use of Bezier curves to define the outline contours of font characters. Series of points are used by the curves to define the outlines. For such Bezier curves, the points can be located on the contours (referred to as "on-curve") or separate from the contours (referred to as "off-curve"). In general, off-curve points represent control points used to define a Bezier curve, and on-curve points represent points located on the contour curves such as end points of the curves. Referring to FIG. 3(a), a quadratic Bezier curve (for TrueType) can be defined by two "on-curve" end points and one "off-curve" control point. In this illustrated example, two quadratic Bezier curves are presented. The first is represented by two end points 300, 302 and a control point 304, and, the second quadratic curve is represented by two on-curve points 302, 306 and a control point 308.

To reduce memory needs, TrueType allows for implicit on-curve points; for example, two off-curve points (e.g., control points) imply an on-curve point that is located at the midpoint of a line between the two off-curve points. As illustrated in the figure, on-curve point 302 is implied from the two off-curve control points 304 and 308. Since the two quadratic Bezier curves share the implicit point 302, the two curves can be encoded for the curve in FIG. 3(a) from the four points (e.g., points 300, 304, 308, and 306) and point 302 is simply implied. As such, two suitable and adjacent quadratic Bezier curve can be encoded from four points. This technique can be exploited when converting cubic Bezier curves into quadratic Bezier curves.

Referring to FIG. 3(b), a cubic Bezier curve 300 is represented by a start point 312, and end point 314 and two control points 316, 318. Five quadratic Bezier curves 320, 322, 324, 326, and 328 are used to encode the cubic Bezier curve. Three points are used to define each quadratic Bezier curve: on-curve start point 312, off-curve control point 330, and implicit point 331 (define quadratic Bezier curve 320), off-curve control point 332 and on-curve implicit points 331 and 333 (define quadratic Bezier curve 322), off-curve control point 334 and on-curve implicit points 333 and 335 (define quadratic Bezier curve 324), off-curve point 336 and on-curve implicit points 335 and 337 (define quadratic Bezier curve 326), and, off-curve point 338, implicit point 337 and end point 314 (define quadratic Bezier curve 328).

Each of the off-curve points are used to define one or more implicit points and can effect multiple quadratic curves. For example, off-curve point 334 is used to define quadratic Bezier curves 322, 324, and 326. As such, if the location of the off-curve point 334 is adjusted to appropriately fit the curves to the cubic Bezier curve 300, each of the three quadratic Bezier curve 322, 324, and 326 can be effected. Correspondingly, adjusting the location of off-curve point 334 can trigger a need to also adjust the location of off-curve points 332 and 336 based on their associations via the quadratic Bezier curves 322 and 326. To address the dependence among multiple quadratic Bezier curves, the converter 208 compares newly generated quadratic curves (e.g., curves 320-328) against the cubic curve (e.g., curve 300). A difference between the curves can be considered acceptable by the converter 208 if the difference amount is within a predefined tolerance. For example, if the difference is equivalent to or below a predefined threshold, the quadratic Bezier curves are considered to be appropriately fitting the original quadratic Bezier curve. In some arrangements, two or more thresholds, rule-based decisions or other techniques may be employed to determine if an appropriate fit has been achieved.

Referring to FIG. 3(c), one threshold checking technique is graphically illustrated that determines if a cubic Bezier curve 340 is being appropriately fitted by a quadratic Bezier curve 342. To clearly illustrate a difference between the two curves, the quadratic Bezier curve 342 does not closely fit the cubic Bezier curve 340. Four points define the cubic curve 340 (i.e., on-curve end points 344 and 346, and, off-curve control points 348 and 350), and, three points define the quadratic curve 342 (i.e., the on-curve end points 344 and 346, and, one off-curve control point 352). In this example, to evaluate the quadratic curve (for fitting to the cubic curve) the allowable difference between the curves is determined from the maximum distance between the two. A series of normal lines (e.g., line 354) are projected from the line segments of the cubic curve 340 to the quadratic curve 342. By projecting normal lines from the cubic curve, numerous quadratic curves can be efficiently checked to identify the quadratic curve providing an appropriate fit. In one arrangement, the length of the normal line segment that extends from the midpoint of the cubic curve 340 to the intersection point of the quadratic curve 342 is determined. This line distance is used to determine is the separation between the curves is within tolerance for fitting the quadratic curve 342 to the cubic curve 340. In some arrangements, the tolerance is specified by the user, e.g., to represent the closeness of the desired fit. This user provided tolerance can be considered, for example, as the maximal orthogonal distance between the cubic curve and the quadratic curve at points along the curves. By using such a tolerance, the font character shape represented by the quadratic curve approximately tracks the original shape provided by the cubic curve within this specified tolerance.

Computation efforts can be reduced by reducing the number of iterations of evaluating the fit between two curves. For example, a technique may be employed that exploits that line segments extended between off-curve control points are tangent to the curve. For example, a line segment between the start point of a cubic Bezier curve and the first control point are tangent to the cubic curve. Similarly, a line segment between the end point of a cubic Bezier curve and second control point are tangent to the cubic curve. Line segments of an evaluated curve also closely approximate tangents to the curve. The number of line segments used by the technique is selected to reduce fitting error. For example, the number of line segments is selected based on the distance between the control points of the curve and the on-curve points being generated.

Figure 4:
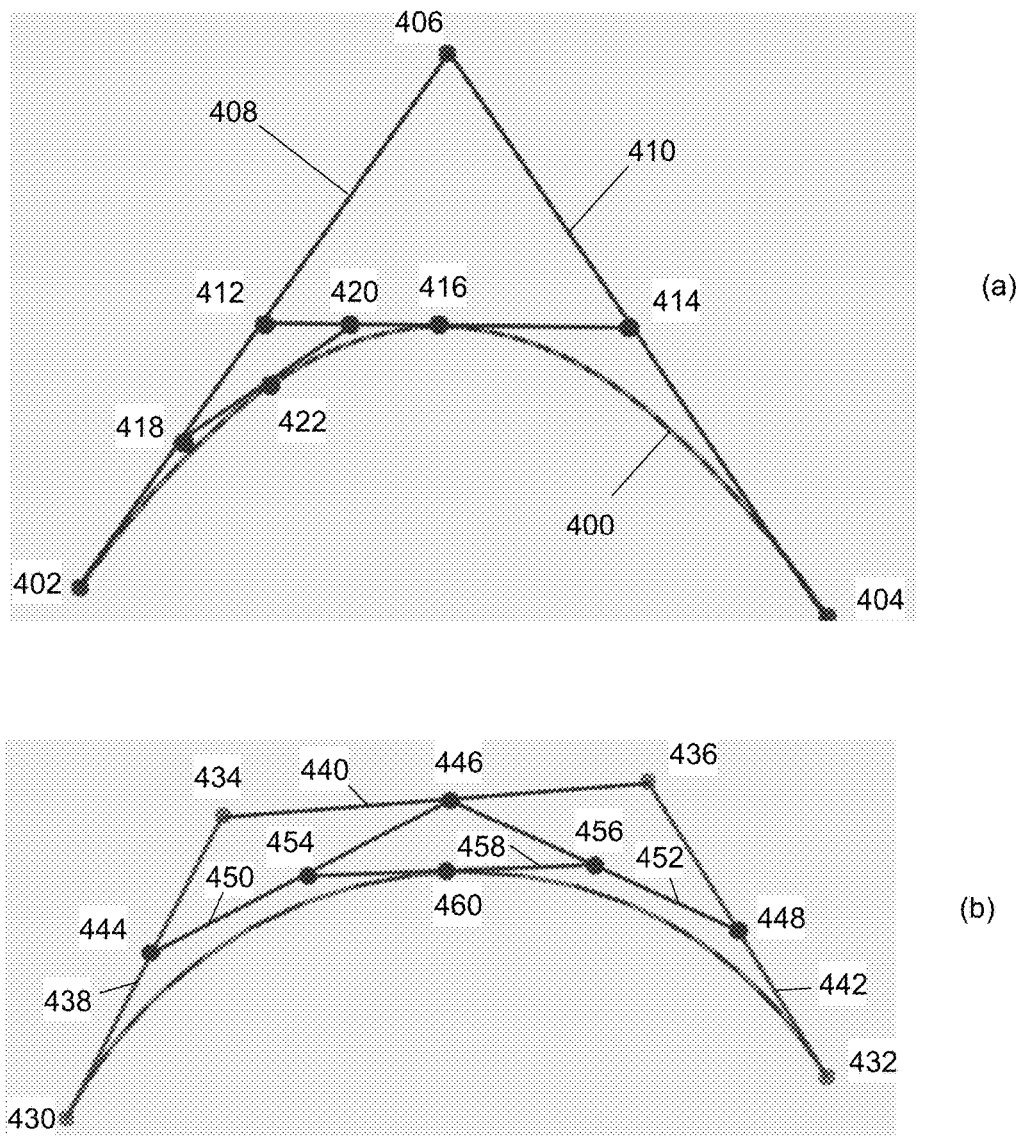

Referring to FIG. 4(a), one or more techniques may be employed to for creating a number of line segments (from which an amount of error is considered within tolerance). For example, a recursive technique (e.g., that uses De Casteljau's algorithm) may be employed to subdivide a quadratic Bezier curve. As illustrated in the figure, a quadratic curve 400 is defined by a start point 402, and end point 404, and an off-curve control point 406. By extending lines 408, 410 between the points, midpoints 412 and 414 can be identified (e.g., using computationally fast shift operations). Continuing in a similar manner, additional midpoints 416, 418, 420 and 422 can be identified. From these midpoints, the quadratic curve 400 can be subdivided. For example, a quadratic curve defined by endpoints 402, 416 and control point 412 can be subdivided into a first quadratic curve defined by endpoints 402, 422 and control point 418, and, a second quadratic curve defined by endpoints 422, 416 and control point 420.

Referring to FIG. 4(b) a cubic Bezier curve may similarly be subdivided. As illustrated in the figure, a cubic curve is defined by start and end points 430, 432 and off-curve control points 434 and 436. Vector 438, 440, 442 correspondingly connect the points 430-436 and have midpoints 444, 446, and 448. From the midpoints 444-448, vectors 450 and 452 are formed that respectively have midpoints 454 and 456. Continuing to use computationally efficient techniques for dividing quantities in half (e.g., shift operations), a midpoint 460 of a vector 458 (formed between the midpoints 454 and 456) can be determined. Through these operations, the cubic curve defined by end points 430 and 432 can be divided into a first cubic curve (defined by on-curve start and end points 430, 460 and off-curve control points 444 and 454) and a second cubic curve (defined by on-curve start and end points 460, 432 and off-curve control points 456 and 448). Lines 438, 450, 458, 452, and 442 between these points provide an approximation to the curve and further subdividing provides a closer approximation. And based upon a desired resolution (e.g., provided by a user of the font editor 106), an appropriate number of line segments can be determined.

Figure 5:
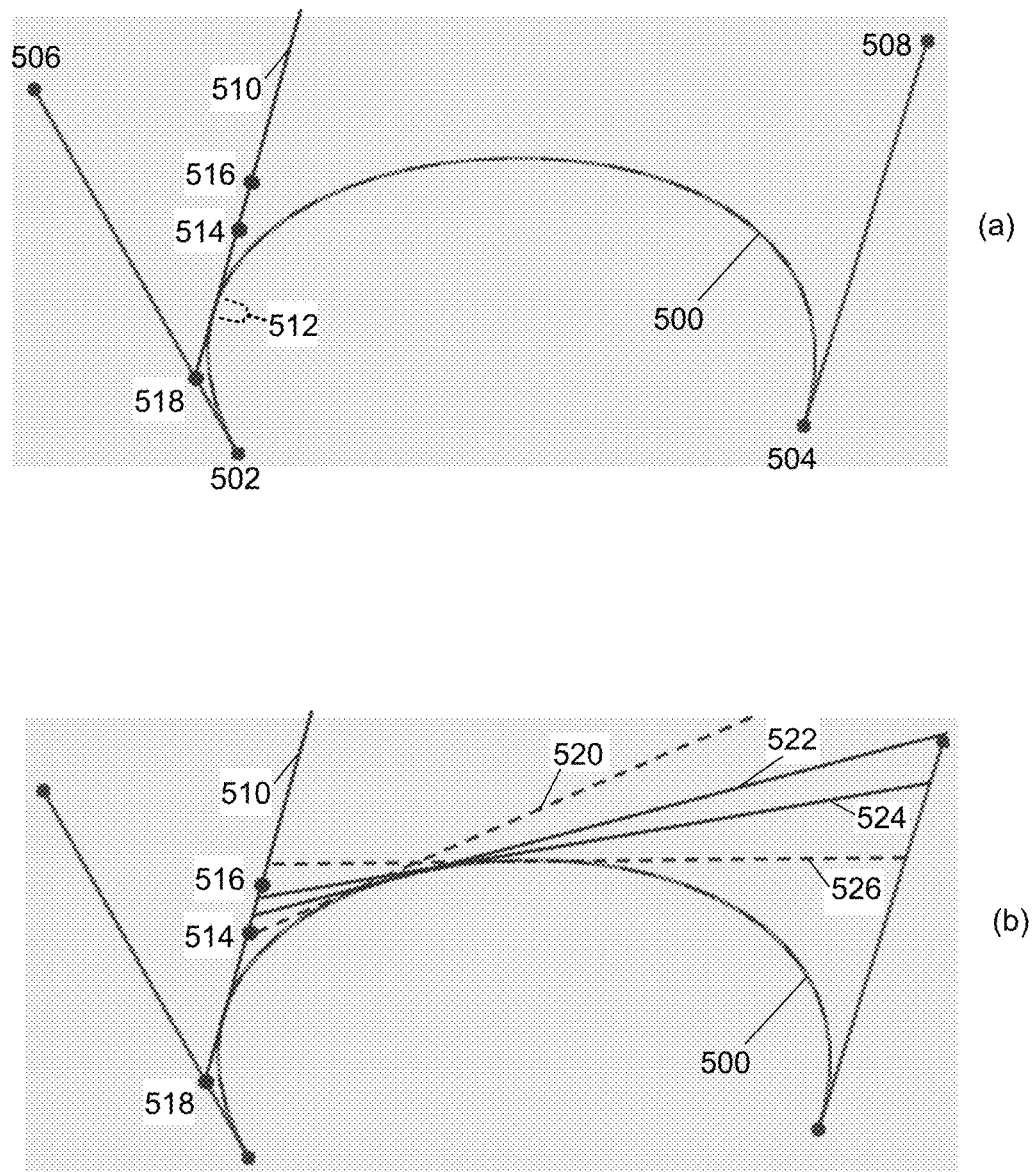

Referring to FIG. 5(a), building on the techniques described above, a cubic Bezier curve can be converted into one or more quadratic Bezier curves. As illustrated, a cubic Bezier curve 500 is defined by a start point 502, an end point 504 and two off-curve control points 506 and 508. By using a collection of quadratic curves to define the cubic curve, the implicit on-curve points can be determined from the corresponding two off-curve control points (of the quadratic curves). Being implied from the off-curve points, the implicit on-curve points do not need to be represented in the data that defines the quadratic curves, thereby reducing the amount of data (e.g., to be stored, transmitted, etc.). As shown in the figure, a tangent line 510 extends in both directions from a line segment 512 that defines the cubic curve 500. In this particular example, the line segment 512 is the fifth line segment from the starting point 502 of the cubic curve 500. Since an on-curve point on line segment 512 is located at the midpoint between two control points, one of the control points is located between points 514 and 516 (which represent length of the segment 512 located twice the distance from control point 518). As such, any control point located between points 514 and 516 causes an implicit on-curve point to be position on the line segment 510. Further, by associating the control point (located between points 514 and 516) with another line segment that is tangent to the cubic curve 500, another quadratic curve can be defined that shares this control point.

Referring to FIG. 5(b), tangent lines are extended from the other line segments that define the cubic curve 500. Dependent upon the location of these segments with respect the line segment 512, the lines may or not properly intersect with the line 510 to identify the location of a control point. A line that intersects between points 514 and 516 would indicate that the associated segment (that defines the cubic curve 500) could share a control point with the line segment 512. However, a line that does not intersect between points 514 and 516 would not be an appropriate candidate. In this example tangent lines are extend from four other segments that define the cubic curve 500. In particular, line 520 extends from the twelfth line segment of the cubic curve and lines 522, 524, and 526 correspondingly extend from the thirteenth, fourteenth, and fifteenth line segments of the cubic curve 500. Lines 522 and 524 appropriately intersect between points 514 and 516 while lines 520 and 526 fall outside of the proper intersecting range defined by the two points. In this example of the technique, a minimal number of points should be used to encode the quadratic Bezier curve. As such, intersecting segments that are located further along the cubic curve are used. In this case, the fourteenth line segment is further along the cubic curve (compared to the thirteenth line segment) and is used. Continuing to move from left to right along the cubic curve 500, additional line segments (tangent to the cubic curve) are identified would appropriately provide additional control points to define quadratic curves. In some instances, recursive operations or similar techniques are employed by the converter 208.

Figure 6:
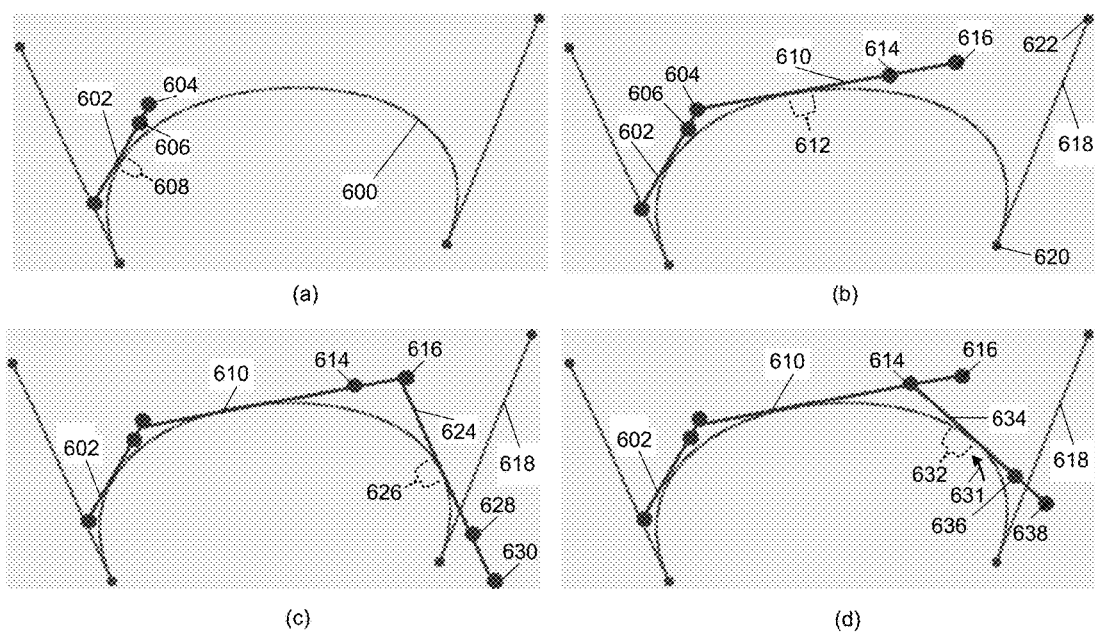

Referring to FIG. 6, a series of graphics illustrates recursive operations for identifying control points (for quadratic curves) based upon a predefined tolerance for encoding a cubic curve. To identify line segments to appropriately fit the cubic curve, each recursive iteration (moving left to right along the cubic curve) generally attempts to add one additional line (tangent to the curve) to the right of the most recently identified tangent line. Line addition is halted if during one iteration, a tangent line is defined that insects the tangent line that extends from the end point of the cubic curve to the second off-curve control point of the cubic curve. After halting, all of the previously identified tangent lines are evaluated for determining a goodness of fit with the cubic curve. Referring to FIG. 6(a), an initial line 602 is defined that is tangent to a segment 608 of a cubic curve 600. Along the line 602 a target zone is defined (between points 604 and 606) such that a control point located within the zone would properly position an implicit point on the segment 608. Of the segments located further along the cubic curve 600, the selected segment is the one furthest away that a tangent line extends into the target zone. For example, referring to FIG. 6(b), line 610 intersects the target zone (between points 602 and 604) and is defined by a segment 612 that the furthest along the cubic curve 600 (compared to other segments for which a tangent line intersects the zone). Additionally, a second target zone is defined (between points 614 and 616) within which a control point would establish an implicit point on the segment 612 of the cubic curve. Along with establishing the second zone, the converter 208 determines if the zone intersects a line 618 that extends from the on-curve end point 620 of the cubic curve 600 to the second control point 622 of the cubic curve. In this instance the line 618 is outside of the second zone (between points 614 and 616). As such, the next recursive iteration is initiated using the line 610. Referring to FIG. 6(c), the next iteration is initiated and a line 624 intersects the second zone (between points 614 and 616) and is defined by a segment 626 that is furthest along the cubic curve 600. Along with using the segment to define the line 624, a third zone is defined (between points 628 and 630) from which a control point would establish an implicit point on the segment 626. Similar to previous iteration, the converter 208 check to determine if the newly defined third zone intersects the line 618 (that is tangent to the end point of the cubic curve). In this instance, the third zone extends beyond the line 618 and the third zone is not intersected by the line 618. Upon executing additional recursive iterations, further defined target zones would similarly extend past the line 618. The converter 208 may use one or more techniques to determine that the current target zone has extended beyond the line 618. For example, a comparison of the coordinates of the points that define the third target zone (e.g., coordinates of points 628 and 630) and the coordinates of the line 618 may indicate that the current iteration and additional iterations (involving segments further toward to the end point of the cubic curve) provide a target zone that would extend beyond the line 618. Other techniques may also be employed by the converter 208. Once alerted that the current zone extends beyond the line tangent to the end point of the cubic curve (and the current zone is not intersected), appropriate operations may be executed by the converter 208. For example, a new segment that is located further back on the cubic curve may be used to define a line and a corresponding new target zone that may be intersected (by the line tangent to the cubic curve end point). Referring to FIG. 6(d), the process steps back (as represented by arrow 631) and another segment 632 tangent to the cubic curve 600 is identified that still extends a line 634 into the second target zone (between points 614 and 616). In this instance, the segment 632 defines a target zone (between points 636 and 638) that is intersected by the line 618. Alerted that a zone has been intersected by the tangent line extending from the end point of the cubic curve, the converter 208 executes operations to check the quadratic curves provided by lines 602, 610, and 634 against the predefined tolerance for closeness of fit with the cubic curve 600.

Referring to FIG. 7, various types of algorithms may be implemented to perform the operations to identify tangent lines for appropriately fitting a cubic curve. For example, a listing of pseudo code 700 is illustrated that contains instructions for converting a cubic curve in a recursive manner. In general, the algorithm implemented is stacked-based and determines the tangent lines for fitting the cubic curve and evaluates the produced quadratic curve for a level of closeness.

Figure 8:
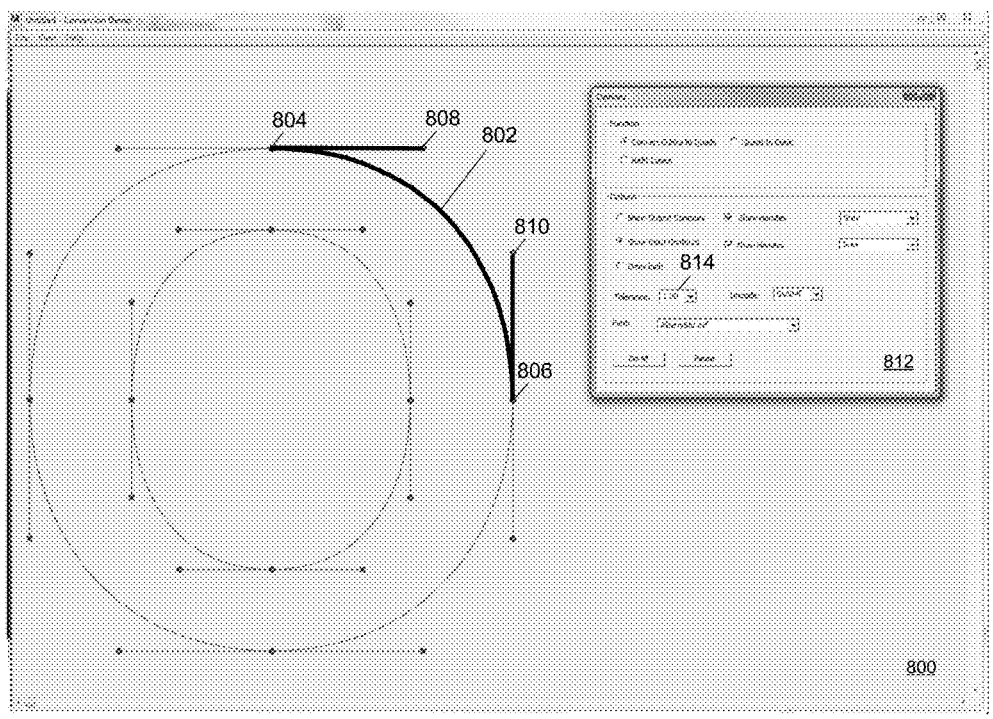
FIGS. 8-12 illustrate graphical user interfaces presenting curves that represent shapes of font character contours.

Referring to FIGS. 8-12, a series of GUI's are presented that graphically demonstrate converting cubic Bezier curves into quadratic Bezier curves while maintaining the represented shapes of a font character. Referring to FIG. 8, a GUI 800 presents a font character (e.g., capital "O") as being represented by cubic Bezier curves. For example, one cubic curve 802 is highlighted and includes a start point 804, an end point 806, and two control characters 808 and 810 (which are connected by lines referred to as handles). As presented by a menu 812, various options are provided for controlling the conversion operations executed by the converter 208. For example, one input field 814 allows a user to input a numerical value that represents a tolerance level for converting the curves. In this arrangement, a font unit value that can range from a fractional value to integer values (greater than one) may be input. Other types of numerical units may be used for tolerance setting; for example, typographical units such as "em" units, which are equivalent the font point size, can be used as a tolerance measure. In this example, the user can also selection the type of conversion (e.g., cubic curves to quadratic curves, or, quadratic curves to cubic curves). In this instance, a selection is made on the menu 812 to convert cubic curves into quadratic curves.

Figure 9:
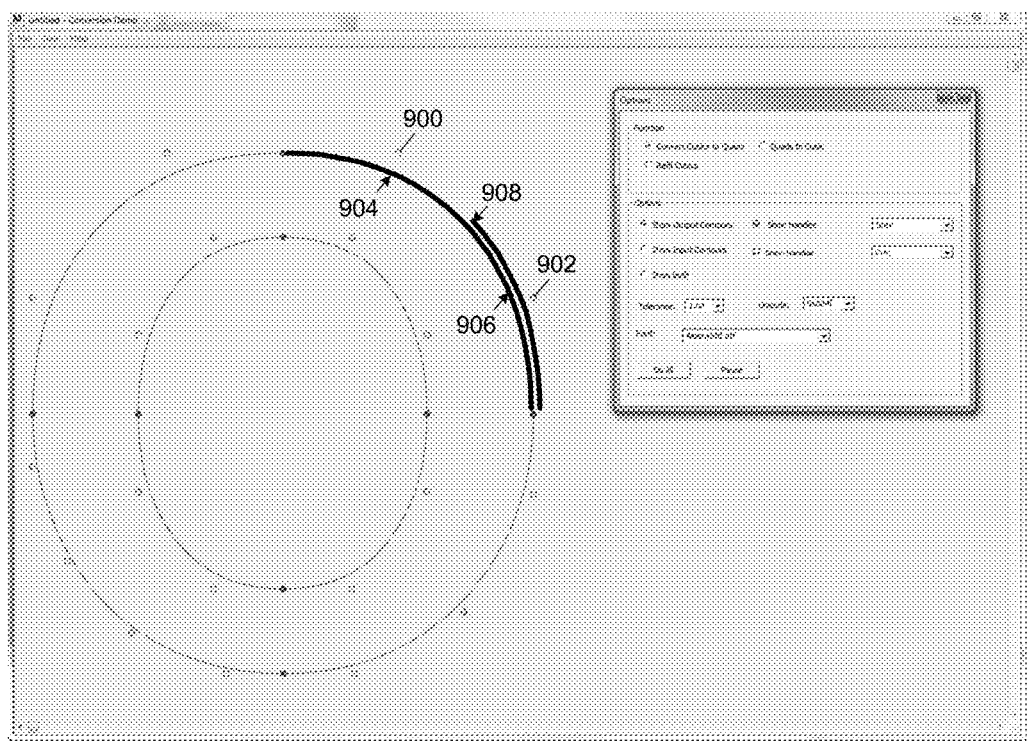

Referring to FIG. 9, a graphical representation is presented of the font character being converted into quadratic Bezier curves (based upon settings in menu 812). Now represented in quadratic Bezier curves, the contours of the font character can be considered as being compatible with TrueType. Hollow points represent control points of the quadratic curves, e.g., hollow points 900 and 902 represent control points of two quadratic Bezier curves 904 and 906 (curve 904 being highlight by a single bold line and curve 906 being highlighted with a double bold line). Since an implicit point is known to be located between the two control points 900 and 902, a data point is not needed to represent this implicit point at its location 908 on the quadratic curve. As such, data representing these implicit points is not needed to represent the contours of the font character, and correspondingly the overall data amount is reduced (e.g., and data storage needs, data transmission times, etc. may be reduced).

Figure 10:
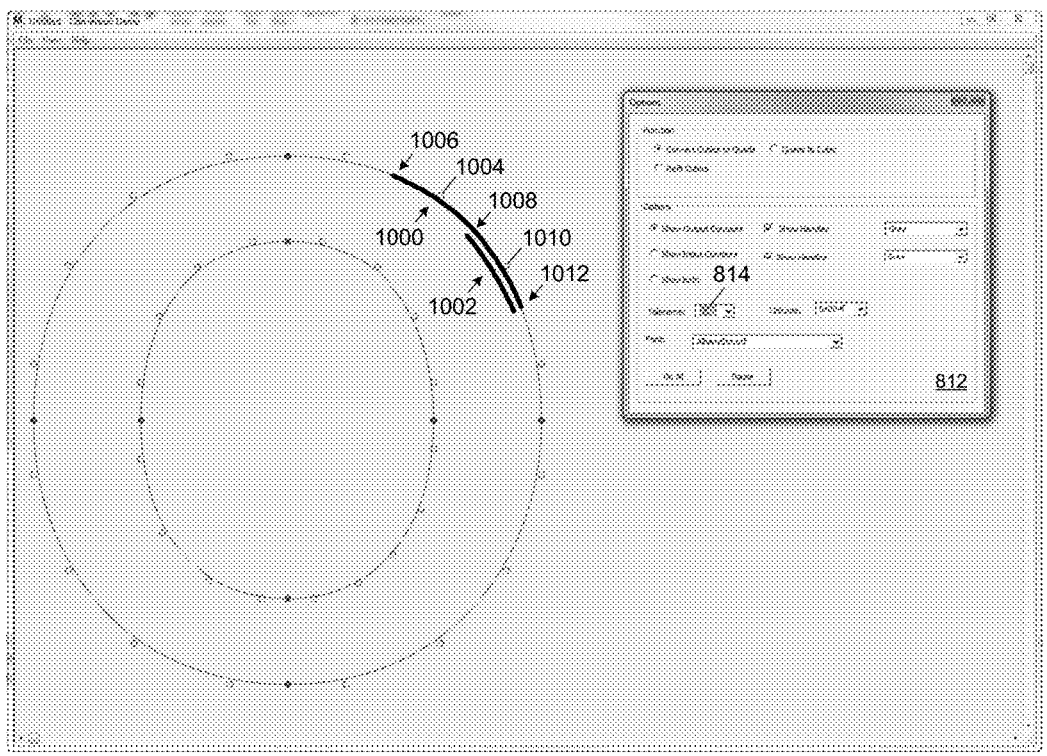

Referring to FIG. 10, by decreasing the tolerance for appropriate fitting of the cubic Bezier curves, more quadratic Bezier curves may be introduced along with more corresponding data points. In the illustrated example, the tolerance is tightened from 1.0 (as presented in field 814 in FIG. 8) to a value of 0.45 in the field 814 (as shown in FIG. 10). In comparison to the number of quadratic curves presented in FIG. 9, an additional number of quadratic curves (and corresponding control points) are now used to represent the contours of the font character. For example, relatively shorter quadratic Bezier curves 1000 and 1002 are used, in which curve 1000 is represented by a single bold line and curve 1002 is represented by a double bold line. Curve 1000 is defined by off curve control point 1004 and implicit points at locations 1006 and 1008, and, curve 1002 is defined by off curve control point 1010 and implicit points at locations 1008 and 1012. These implicit points located at the midpoint of a line connecting the control points and tangent to the quadratic curve (e.g., at location 1006, 1008, and 1012) do not need to be stored for later representing the contours of the font character.

Figure 11:
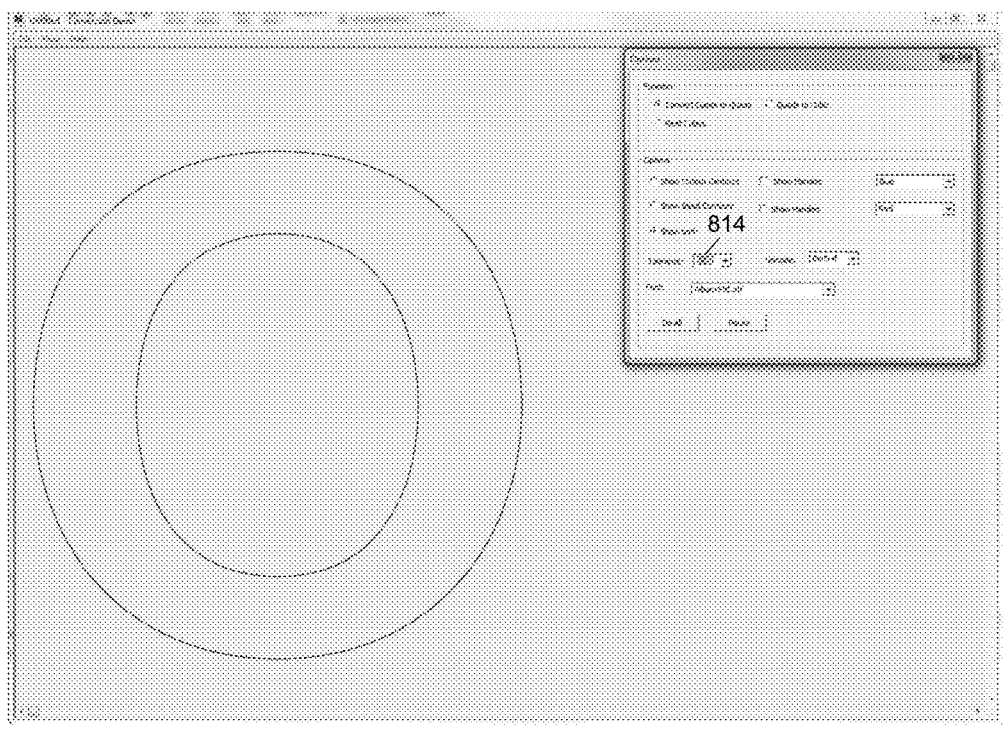
Figure 12:
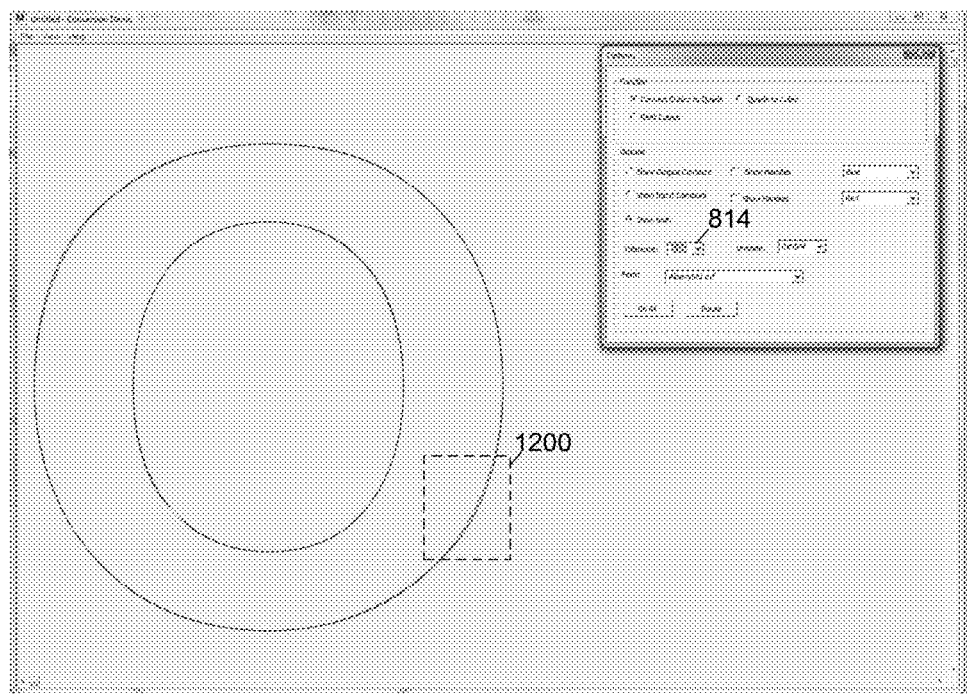

Referring to FIGS. 11 and 12, comparisons between cubic curve representations of the contours (of the font character) and quadratic curve representations are presented. For FIG. 11, a relatively tight tolerance (i.e., 0.45) input into field 814 is used to produce quadratic curve contours. Due to this tolerance, the cubic and quadratic curves align closely with very little separation. For FIG. 12, a wider tolerance (i.e., 3.00) is set into the field 814. While the quadratic Bezier curves still fit relatively well to the cubic Bezier curves, slight departures are detectable, as highlighted by dashed-line box 1200. However, from a viewer's perspective such departures may be relatively undetectable and could be considered reasonable for presentation while needing considerably less data to represent the contours of the character font.

Figure 13:
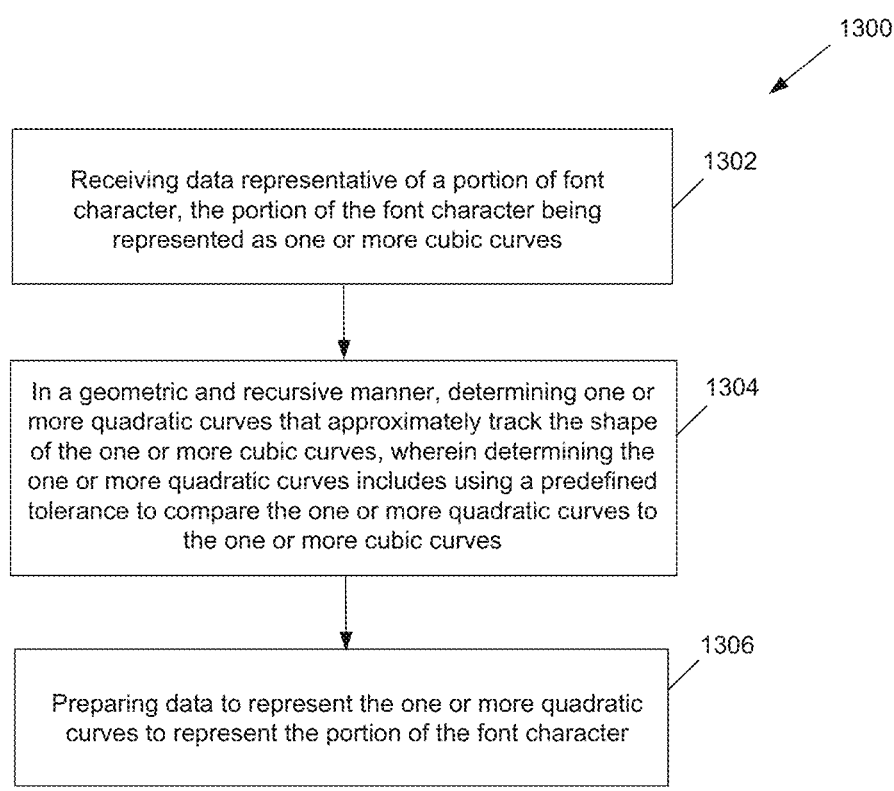
FIG. 13 illustrates a flow chart of operations executed by a font curve converter.

Referring to FIG. 13, a flowchart 1300 represents operations of a curve converter (e.g., the converter 208 shown in FIG. 2). Operations of the converter 208 are typically executed by a single computing device (e.g., the computer 200); however, operations of the converter may be executed by multiple computing devices. Along with being executed at a single site, execution of operations may be distributed among two or more locations.

Operations of the converter may include receiving 1302 data representative of a portion of a font character. The portion of the font character is represented as one or more cubic curves. For example, a designer may use cubic Bezier curves (e.g., provided by font editing software) to design the contours of a font character (e.g., that complies with Open-Type). In some arrangements, each of the cubic curves is defined by four points. Operations may also include, in a geometric and recursive manner, determining 1304 one or more quadratic curves that approximately tracks the shape of the one or more cubic curves. Determining the one or more quadratic curves includes using a predefined tolerance to compare the one or more quadratic curves to the one or more cubic curves. For example, as presented in FIG. 9, a collection of quadratic Bezier curves can be defined to approximately track the shape of the contours of a font character that are represented by cubic Bezier curves (as shown in FIG. 8). In some arrangements, each of the quadratic curves is defined by three points. Based upon a user supplied tolerance value, a level of closeness that the quadratic curves should track the cubic curves can be determined. To achieve the level of closeness, the number of line segments needed achieve this level can be determined. For example, by evaluating the quadratic and cubic curves, the converter can determine is additional line segments are needed to reach the level of closeness. Operations also include preparing data to represent the one or more quadratic curves to represent the portion of the font character. For example, data the represents the control points of the quadratic curves may be prepared. However, due to the implied nature of the on-curve points that lay on tangents between the off-curve control points, these implicit on-curve points do not need to be represented in the prepared data, thereby reduce the amount of data needed to represent the curves.

Figure 14:
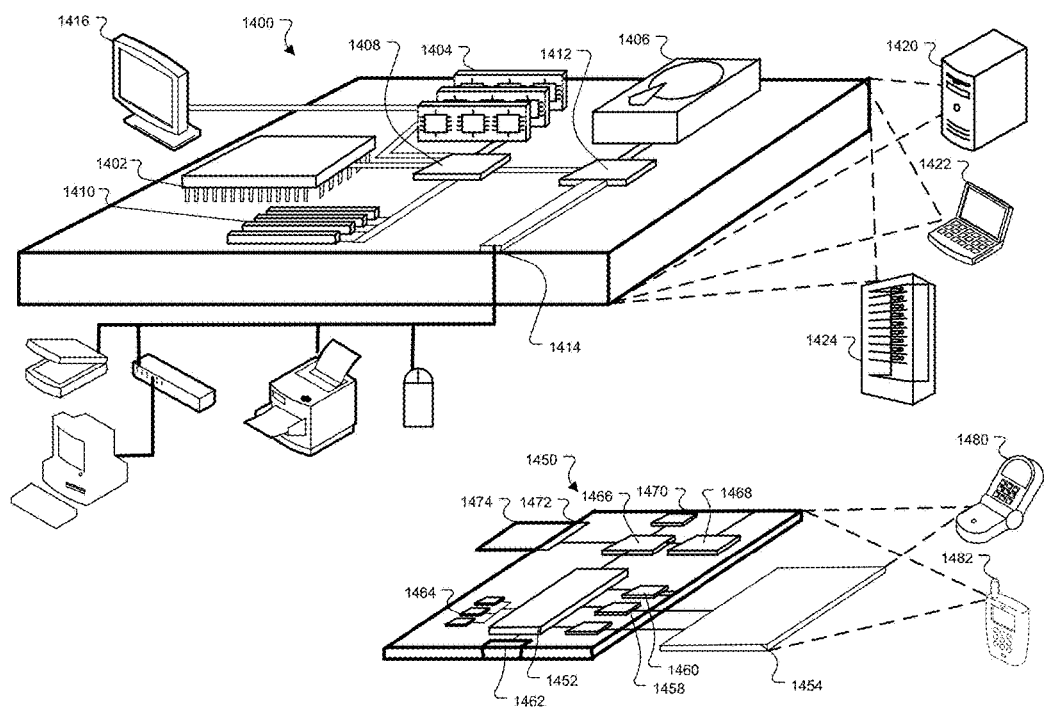
FIG. 14 illustrates an example of a computing device and a mobile computing device that can be used to implement the techniques described here.

FIG. 14 shows an example of example computer device 1400 and example mobile computer device 1450, which can be used to implement the techniques described herein. For example, a portion or all of the operations of the converter 208 (shown in FIG. 2) may be executed by the computer device 1400 and/or the mobile computer device 1450. Computing device 1400 is intended to represent various forms of digital computers, including, e.g., laptops, desktops, workstations, personal digital assistants, servers, blade servers, mainframes, and other appropriate computers. Computing device 1450 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1400 includes processor 1402, memory 1404, storage device 1406, high-speed interface 1408 connecting to memory 1404 and high-speed expansion ports 1410, and low speed interface 1412 connecting to low speed bus 1414 and storage device 1406. Each of components 1402, 1404, 1406, 1408, 1410, and 1412, are interconnected using various busses, and can be mounted on a common motherboard or in other manners as appropriate. Processor 1402 can process instructions for execution within computing device 1400, including instructions stored in memory 1404 or on storage device 1406 to display graphical data for a GUI on an external input/output device, including, e.g., display 1416 coupled to high speed interface 1408. In other implementations, multiple processors and/or multiple busses can be used, as appropriate, along with multiple memories and types of memory. Also, multiple computing devices 1400 can be connected, with each device providing portions of the necessary operations (e.g., as a server bank, a group of blade servers, or a multi-processor system).

Memory 1404 stores data within computing device 1400. In one implementation, memory 1404 is a volatile memory unit or units. In another implementation, memory 1404 is a non-volatile memory unit or units. Memory 1404 also can be another form of computer-readable medium (e.g., a magnetic or optical disk. Memory 1404 may be non-transitory.)

Storage device 1406 is capable of providing mass storage for computing device 1400. In one implementation, storage device 1406 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1404, storage device 1406, memory on processor 1402, and the like.)

High-speed controller 1408 manages bandwidth-intensive operations for computing device 1400, while low speed controller 1412 manages lower bandwidth-intensive operations. Such allocation of functions is an example only. In one implementation, high-speed controller 1408 is coupled to memory 1404, display 1416 (e.g., through a graphics processor or accelerator), and to high-speed expansion ports 1410, which can accept various expansion cards (not shown). In the implementation, low-speed controller 1412 is coupled to storage device 1406 and low-speed expansion port 1414. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1400 can be implemented in a number of different forms, as shown in the figure. For example, it can be implemented as standard server 1420, or multiple times in a group of such servers. It also can be implemented as part of rack server system 1424. In addition or as an alternative, it can be implemented in a personal computer (e.g., laptop computer 1422.) In some examples, components from computing device 1400 can be combined with other components in a mobile device (not shown), e.g., device 1450. Each of such devices can contain one or more of computing device 1400, 1450, and an entire system can be made up of multiple computing devices 1400, 1450 communicating with each other.

Computing device 1450 includes processor 1452, memory 1464, an input/output device (e.g., display 1454, communication interface 1466, and transceiver 1468) among other components. Device 1450 also can be provided with a storage device, (e.g., a microdrive or other device) to provide additional storage. Each of components 1450, 1452, 1464, 1454, 1466, and 1468, are interconnected using various buses, and several of the components can be mounted on a common motherboard or in other manners as appropriate.

Processor 1452 can execute instructions within computing device 1450, including instructions stored in memory 1464. The processor can be implemented as a chipset of chips that include separate and multiple analog and digital processors. The processor can provide, for example, for coordination of the other components of device 1450, e.g., control of user interfaces, applications run by device 1450, and wireless communication by device 1450.

Processor 1452 can communicate with a user through control interface 1458 and display interface 1456 coupled to display 1454. Display 1454 can be, for example, a TFT LCD (Thin-Film-Transistor Liquid Crystal Display) or an OLED (Organic Light Emitting Diode) display, or other appropriate display technology. Display interface 1456 can comprise appropriate circuitry for driving display 1454 to present graphical and other data to a user. Control interface 1458 can receive commands from a user and convert them for submission to processor 1452. In addition, external interface 1462 can communicate with processor 1442, so as to enable near area communication of device 1450 with other devices. External interface 1462 can provide, for example, for wired communication in some implementations, or for wireless communication in other implementations, and multiple interfaces also can be used.

Memory 1464 stores data within computing device 1450. Memory 1464 can be implemented as one or more of a computer-readable medium or media, a volatile memory unit or units, or a non-volatile memory unit or units. Expansion memory 1474 also can be provided and connected to device 1450 through expansion interface 1472, which can include, for example, a SIMM (Single In Line Memory Module) card interface. Such expansion memory 1474 can provide extra storage space for device 1450, or also can store applications or other data for device 1450. Specifically, expansion memory 1474 can include instructions to carry out or supplement the processes described above, and can include secure data also. Thus, for example, expansion memory 1474 can be provided as a security module for device 1450, and can be programmed with instructions that permit secure use of device 1450. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1464, expansion memory 1474, and/or memory on processor 1452), which can be received, for example, over transceiver 1468 or external interface 1462.

Device 1450 can communicate wirelessly through communication interface 1466, which can include digital signal processing circuitry where necessary. Communication interface 1466 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1468. In addition, short-range communication can occur, e.g., using a Bluetooth®, WiFi, or other such transceiver (not shown). In addition, GPS (Global Positioning System) receiver module 1470 can provide additional navigation- and location-related wireless data to device 1450, which can be used as appropriate by applications running on device 1450. Sensors and modules such as cameras, microphones, compasses, accelerators (for orientation sensing), etc. may be included in the device.

Device 1450 also can communicate audibly using audio codec 1460, which can receive spoken data from a user and convert it to usable digital data. Audio codec 1460 can likewise generate audible sound for a user, (e.g., through a speaker in a handset of device 1450.) Such sound can include sound from voice telephone calls, can include recorded sound (e.g., voice messages, music files, and the like) and also can include sound generated by applications operating on device 1450.

Computing device 1450 can be implemented in a number of different forms, as shown in the figure. For example, it can be implemented as cellular telephone 1480. It also can be implemented as part of smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   receiving data representative of a portion of a font character, the portion of the font character being represented as one or more cubic curves;
   in a geometric and recursive manner, determining two or more quadratic curves that approximately track the shape of the one or more cubic curves, wherein determining the two or more quadratic curves includes identifying one or more points located at a midpoint between other points defining and located on the two or more quadratic curves and using a predefined tolerance to compare the two or more quadratic curves to the one or more cubic curves; and
   preparing data to represent the two or more quadratic curves to represent the portion of the font character, wherein the prepared data is absent data representing the one or more points located at the midpoint between the other points defining the two or more quadratic curves.

2. The computing device implemented method of claim 1, wherein the one or more cubic curves are cubic Bezier curves.

3. The computing device implemented method of claim 1, wherein the two or more quadratic curves are quadratic Bezier curves.

4. The computing device implemented method of claim 1, wherein at least one point defining one of the two or more quadratic curves is located at a midpoint between two other points.

5. The computing device implemented method of claim 4, wherein the at least one point is located on a tangent to one of the two or more quadratic curves.

6. The computing device implemented method of claim 1, wherein the predefined tolerance is user specified.

7. The computing device implemented method of claim 1, wherein the predefined tolerance represents the maximal orthogonal distance between at least one of the one or more cubic curves and at least one of the two or more quadratic curves.

8. The computing device implemented method of claim 1, wherein each of the one or more cubic curves is defined by at least four points.

9. The computing device implemented method of claim 1, wherein each of the two or more quadratic curves is defined by at least three points.

10. The computing device implemented method of claim 1, wherein the other points defining the two or more quadratic curves are control points.

11. A system comprising:
    a computing device comprising:
       a memory configured to store instructions; and
       a processor to execute the instructions to perform operations comprising:
          receiving data representative of a portion of a font character, the portion of the font character being represented as one or more cubic curves;
          in a geometric and recursive manner, determining two or more quadratic curves that approximately track the shape of the one or more cubic curves, wherein determining the two or more quadratic curves includes identifying one or more points located at a midpoint between other points defining and located on the two or more quadratic curves and using a predefined tolerance to compare the two or more quadratic curves to the one or more cubic curves; and
          preparing data to represent the two or more quadratic curves to represent the portion of the font character, wherein the prepared data is absent data representing the one or more points located at the midpoint between the other points defining the two or more quadratic curves.

12. The system of claim 11, wherein the one or more cubic curves are cubic Bezier curves.

13. The system of claim 11, wherein the two or more quadratic curves are quadratic Bezier curves.

14. The system of claim 11, wherein at least one point defining one of the two or more quadratic curves is located at a midpoint between two other points.

15. The system of claim 14, wherein the at least one point is located on a tangent to one of the two or more quadratic curves.

16. The system of claim 11, wherein the predefined tolerance is user specified.

17. The system of claim 11, wherein the predefined tolerance represents the maximal orthogonal distance between at least one of the one or more cubic curves and at least one of the two or more quadratic curves.

18. The system of claim 11, wherein each of the one or more cubic curves is defined by at least four points.

19. The system of claim 11, wherein each of the two or more quadratic curves is defined by at least three points.

20. The system of claim 11, wherein the data absent from the data prepared to represent the two or more quadratic curves represents at least one point located at a midpoint between two control points.

21. The system of claim 11, wherein the other points defining the two or more quadratic curves are control points.

22. One or more non-transitory computer readable media storing instructions that are executable by a processing device, and upon such execution cause the processing device to perform operations comprising:
    receiving data representative of a portion of a font character, the portion of the font character being represented as one or more cubic curves;
    in a geometric and recursive manner, determining two or more quadratic curves that approximately track the shape of the one or more cubic curves, wherein determining the two or more quadratic curves includes identifying one or more points located at a midpoint between other points defining and located on the two or more quadratic curves and using a predefined tolerance to compare the two or more quadratic curves to the one or more cubic curves; and preparing data to represent the one or more quadratic curves to represent the portion of the font character, wherein the prepared data is absent data representing the one or more points located at the midpoint between the other points defining the two or more quadratic curves.

23. The non-transitory computer readable media of claim 22, wherein the one or more cubic curves are cubic Bezier curves.

24. The non-transitory computer readable media of claim 22, wherein the two or more quadratic curves are quadratic Bezier curves.

25. The non-transitory computer readable media of claim 22, wherein at least one point defining one of the two or more quadratic curves is located at a midpoint between two other points.

26. The non-transitory computer readable media of claim 25, wherein the at least one point is located on a tangent to one of the two or more quadratic curves.

27. The non-transitory computer readable media of claim 22, wherein the predefined tolerance is user specified.

28. The non-transitory computer readable media of claim 22, wherein the predefined tolerance represents the maximal orthogonal distance between at least one of the one or more cubic curves and at least one of the two or more quadratic curves.

29. The non-transitory computer readable media of claim 22, wherein each of the one or more cubic curves is defined by at least four points.

30. The non-transitory computer readable media of claim 22, wherein each of the two or more quadratic curves is defined by at least three points.

* * * * *